US007866852B2

(12) United States Patent
Kulkarni

(10) Patent No.: US 7,866,852 B2
(45) Date of Patent: Jan. 11, 2011

(54) HEAT SINKS FOR COOLING LEDS IN PROJECTORS

(75) Inventor: Amit A. Kulkarni, Highland Village, TX (US)

(73) Assignee: Texas Instruments Incorporated, Dallas, TX (US)

( * ) Notice: Subject to any disclaimer, the term of this patent is extended or adjusted under 35 U.S.C. 154(b) by 124 days.

(21) Appl. No.: 12/199,619

(22) Filed: Aug. 27, 2008

(65) Prior Publication Data

US 2009/0059582 A1 Mar. 5, 2009

Related U.S. Application Data

(60) Provisional application No. 60/968,881, filed on Aug. 29, 2007.

(51) Int. Cl.
*F21V 29/00* (2006.01)
(52) U.S. Cl. .................. 362/294; 362/373; 362/218
(58) Field of Classification Search .......... 362/373, 362/294, 231, 249.02, 547, 545; 353/60, 353/57, 94
See application file for complete search history.

(56) References Cited

U.S. PATENT DOCUMENTS

| 6,974,234 | B2 | 12/2005 | Galli | |
|---|---|---|---|---|
| 7,074,631 | B2 | 7/2006 | Erchak et al. | |
| 7,075,118 | B2 | 7/2006 | Seki | |
| 7,170,100 | B2 | 1/2007 | Erchak et al. | |
| 7,384,151 | B2 | 6/2008 | Seki | |
| 7,400,439 | B2 | 7/2008 | Holman | |
| 2003/0156416 | A1* | 8/2003 | Stopa et al. | 362/294 |
| 2005/0201107 | A1* | 9/2005 | Seki | 362/373 |
| 2006/0215124 | A1* | 9/2006 | Seo | 353/52 |
| 2008/0144329 | A1* | 6/2008 | Okuda | 362/539 |
| 2008/0232100 | A1* | 9/2008 | Lin et al. | 362/231 |
| 2009/0059580 | A1* | 3/2009 | Kwon | 362/231 |
| 2009/0161354 | A1* | 6/2009 | Hsu et al. | 362/227 |

OTHER PUBLICATIONS

Desmond, "Samsung SP-P310MEMX Pocket Imager DLP LED Projector," Tiger Direct News, http://news.tigerdirect.com/2008/02/07/samsung-sp-p310memx-pocket-imager-dlp-led-projector, 3 pages, Feb. 7, 2008.

(Continued)

*Primary Examiner*—Ismael Negron
*Assistant Examiner*—Julie A Shallenberger
(74) *Attorney, Agent, or Firm*—Charles A. Brill; Wade James Brady, III; Frederick J. Telecky, Jr.

(57) ABSTRACT

According to certain embodiments, an apparatus for cooling light emitting diodes (LEDs) in projectors includes one or more first LEDs, one or more first heat sinks, one or more second LEDs, and one or more second heat sinks. The first LEDs are configured to generate light, and each first LED has a first desired junction temperature. The first heat sinks are configured to dissipate heat generated by the first LEDs. The second LEDs are configured to generate light, and each second LED has a second desired junction temperature that is higher than the first desired junction temperature. The second heat sinks are configured to dissipate heat generated by the one or more second LEDs. A cooling fan directs air flow over the first heat sinks and the second heat sinks, and an exhaust vent enables the air flow over the first heat sinks and the second heat sinks.

14 Claims, 2 Drawing Sheets

OTHER PUBLICATIONS

Unknown, "LG pocket projector driven by Luminus LEDs," Industry News, LEDs Magazine, http://www.ledsmagazine.com/news/4/1/10, 2 pages, Jan. 1, 2007.

Feierman, A., "Mitsubishi PK20 Image Quality General Performance Warranty Summary, Pros, Cons," Mitsubishi PK20 LED, Palm-Sized Pocket Projector Review Overview, http://www.projefctorreviews.com/mitsubishi/pk-20-0pocketprojector/,4 pages, Jun. 6, 2007.

* cited by examiner

HEAT SINKS FOR COOLING LEDS IN PROJECTORS

RELATED APPLICATION

This application claims benefit under 35 U.S.C. §119(e) of U.S. Provisional Application Ser. No. 60/968,881, entitled "OPTIMIZED HEAT SINK SOLUTION TO COOL LEDS IN A SMALL FORM FACTOR PROJECTOR APPLICATION," filed Aug. 29, 2007, by Amit A. Kulkarni.

TECHNICAL FIELD

This invention generally relates to image projectors and, more particularly, to heat sinks for cooling LEDs in projectors.

BACKGROUND

Image projectors display images on external surfaces. An image projector may display a single image or a series of images such as a video. Image projectors use a variety of light sources such as cathode ray tubes (CRTs), spatial light modulation devices, lasers, and light emitting diodes (LEDs). A typical LED image projector employs a red LED, a green LED, and a blue LED to generate light. At certain junction temperatures, an LED might not provide light of sufficient intensity and/or reliability. Accordingly, one challenge associated with LED image projectors is controlling the junction temperatures of the LEDs.

SUMMARY OF THE DISCLOSURE

According to certain embodiments of the present invention, disadvantages and problems associated with controlling the junction temperatures of light emitting diodes (LEDs) may be reduced or eliminated.

According to certain embodiments, an apparatus for cooling light emitting diodes (LEDs) in projectors includes one or more first LEDs, one or more first heat sinks, one or more second LEDs, and one or more second heat sinks. The first LEDs are configured to generate light, and each first LED has a first desired junction temperature. The first heat sinks are configured to dissipate heat generated by the first LEDs. The second LEDs are configured to generate light, and each second LED has a second desired junction temperature that is higher than the first desired junction temperature. The second heat sinks are configured to dissipate heat generated by the one or more second LEDs. A cooling fan directs air flow over the first heat sinks and the second heat sinks, and an exhaust vent enables the air flow over the first heat sinks and the second heat sinks.

Certain embodiments may provide numerous technical advantages. Some embodiments may utilize some, none, or all of these advantages. According to some embodiments, the junction temperature of a red LED is controlled separately from the temperature of the green and blue LEDs. For example, one heat sink may be used for the red LED, and another heat sink may be used for the green and blue LEDs. In the embodiments, the volumes of the heat sinks may be independently selected to reduce and optimize the overall volume of the heat sinks.

According to certain embodiments, a cooling fan, such as a blower fan, an axial fan, or an exhaust fan, may direct air flow over the heat sink for the red LED before the heat sink for the green and blue LEDs, which may provide cooler air to the red LED than the other LEDs. According to particular embodiments, a thermal subsystem for the red LED may be separated from a thermal subsystem for the green and blue LEDs by an air gap. The air gap may reduce the exchange of heat between the thermal subsystems, which may reduce the air flow requirement of the fan and/or the volume requirement of the heat sinks.

Other technical advantages may be readily ascertained by one of skill in the art.

BRIEF DESCRIPTION OF THE FIGURES

A more complete understanding of embodiments of the invention will be apparent from the detailed description taken in conjunction with the accompanying drawings, wherein like reference numbers represent like parts, in which.

DETAILED DESCRIPTION OF EXAMPLE EMBODIMENTS

Example embodiments of the invention are best understood by referring to FIGS. 1 through 4 of the drawings, like numerals being used for like and corresponding parts of the various drawings.

Figure 1:
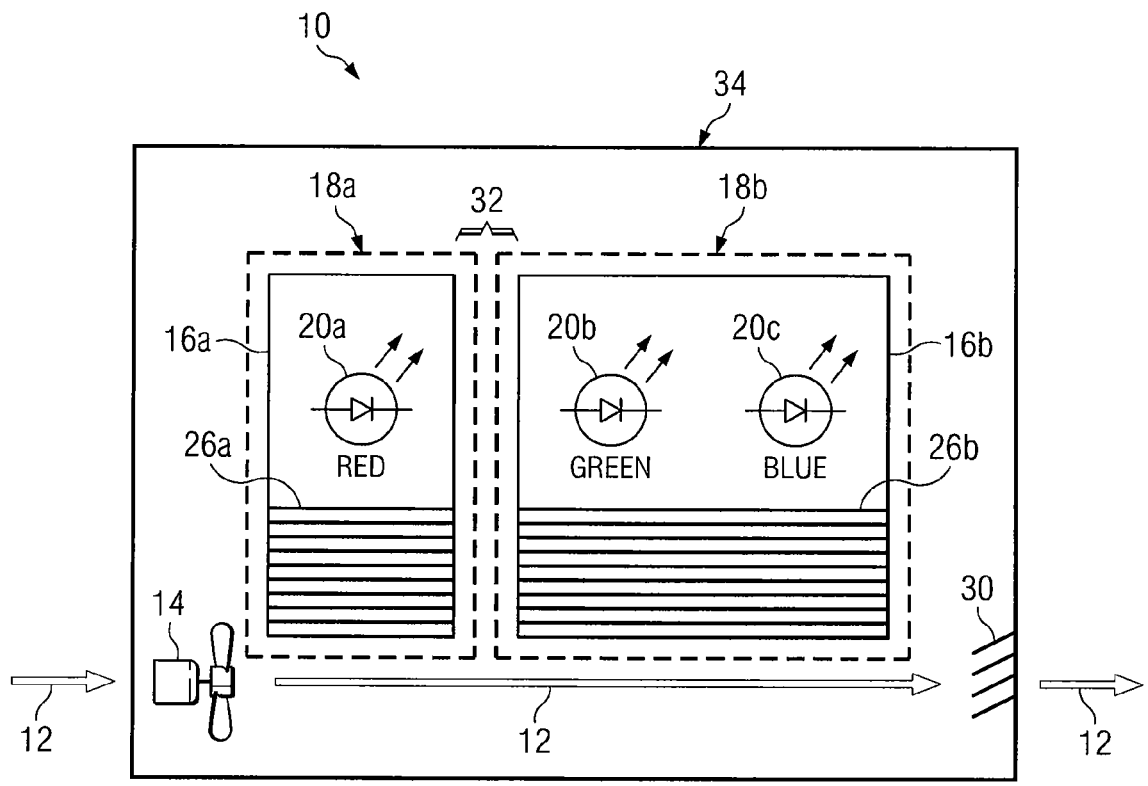
FIG. 1 is a block diagram illustrating an embodiment of a projector.

FIG. 1 is a block diagram illustrating an embodiment of an image projector 10. In the illustrated embodiment, projector 10 includes thermal subsystems 18 (18a, b). First thermal subsystem 18a includes one or more first light sources 20a ("light emitters" or "LEDs") and one or more first heat dissipation units 26a (or "heat sinks") coupled to a first circuit board 16a. First light source 20a is thermally coupled to first heat dissipation unit 26a. Second thermal subsystem 18b includes one or more second light sources 20b, 20c and one or more second heat dissipation units 26b coupled to a second circuit board 16b. Second light sources 20b, 20c are thermally coupled to second heat dissipation unit 26b. An air gap 32 is located between first thermal subsystem 18a and second thermal subsystem 18b. Projector 10 may also include a fan 14 (or "cooling fan") and/or a vent 30 (or "exhaust vent"). Fan 14 and/or vent 30 create air flow 12 through projector 10. A housing 34 houses thermal subsystems 18, fan 14, and/or vent 30.

In certain embodiments, projector 10 includes separate heat dissipation units 26 for different light sources 20 that may have different desired junction temperatures. Heat dissipation unit 26a may more strictly control light source 20a with a stricter desired junction temperature, while another heat dissipation unit 26b may less strictly control another light source 20b, 20c with a less strict desired junction temperature. Using separate heat dissipation units 26 may more efficiently control the junction temperatures of different light sources 20.

In certain embodiments, projector 10 may represent any device configured to receive a data or video signal communicating image information and to generate an image represented by the image information. In some embodiments, projector 10 may form an image on a screen of projector 10 (such as a television or computer screen) or may project an image onto an external object (such as an external screen). Examples of projector 10 include a light emitting diode (LED) projector, a cathode ray tube (CRT) projector, a liquid crystal display (LCD) projector, a digital light processing (DLP) projector, and/or any other suitable projector.

In certain embodiments, projector 10 may represent a small form factor projector. A small form factor projector may be portable or fixed. A portable projector may weigh less than five pounds, may have dimensions less than 1'×1'×6", and may have a handle. A portable projector may have an internal power supply, such as a battery, or may be connected to an external power source, such as an electrical outlet. A fixed projector may be fixed to a floor, wall, or ceiling, and may further require a connection to an external power source, such as an electrical outlet, in order to project an image.

Light source 20 may represent any suitable device configured to provide light. Examples of light sources 20 include LEDs and mercury vapor lamps. Light source 20 may provide light of any suitable wavelength. In the illustrated embodiment, light source 20a is a red LED, light source 20b is a green LED, and light source 20c is a blue LED.

The junction temperature of an LED affects the intensity of light generated by the LED and/or the reliability of the LED. If the junction temperature is too high, the LED may not yield light of satisfactory intensity and/or reliability. In certain embodiments, the desired junction temperature of an LED may be the highest junction temperature at which the LED yields light having intensity and/or reliability satisfactory for a particular application. An LED with a stricter desired junction temperature may require a lower junction temperature to yield a satisfactory light intensity and/or reliability. An LED with a less strict desired junction temperature may yield a satisfactory light intensity and/or reliability at a higher junction temperature.

In the illustrated embodiment, the red LED may have a desired junction temperature of approximately 60° C., and the green and blue LEDs may have a desired junction temperature of 90° C. To yield a satisfactory light intensity and/or reliability, the red LED may require a junction temperature of 60° C. to 70° C., while the green and blue LEDs may require junction temperatures of 90° C. to 120° C. That is, the red LED has a stricter desired junction temperature than those of the green and blue LEDs.

In general, a stricter desired junction temperature indicates greater temperature sensitivity. In certain cases, however, LEDs with the same desired junction temperature may have different temperature sensitivities. For example, the green and blue LEDs have the same desired junction temperature. The green LED, however, exhibits a greater decrease in intensity and/or reliability at temperatures above the desired junction temperature than the blue LED does. Thus, the green LED is more temperature sensitive than the blue LED, even though they have the same desired junction temperature.

Desired junction temperatures of 60° C. and 90° C. are provided as examples only. Desired junction temperatures may have any suitable values, such as less than 25° C., 25° C. to 60° C., 60° C. to 70° C., 80° C. to 120° C., or 120° C. or greater.

Heat dissipation units 26a and 26b dissipate heat from the light sources 20a and 20b, 20c, respectively, to control the junction temperatures of light sources 20a and 20b, 20c. In certain embodiments, heat sinks 26 may represent any device operable to absorb and dissipate heat from another object using either direct or radiant thermal contact. Examples of heat sinks 26 include finned heat sinks, radial heat sinks with swirling forced convection flow, liquid cooled heat sinks, liquid cold plates, and pin fin heat sinks. Certain embodiments may have a thermal interface material between the heat sink 26a and the first circuit board 16a. Heat dissipation units 26 are described in more detail with reference to FIGS. 3 and 4. In the illustrated embodiment, first heat dissipation unit 26a more strictly controls the junction temperature of the red LED, and second heat dissipation unit 26b less strictly controls the junction temperatures of the green and blue LEDs.

Circuit board 16a mechanically and thermally couples light source 20a and heat dissipation unit 26a, and circuit board 16b mechanically and thermally couples light source 20b, light source 20c, and heat dissipation unit 26b. Examples of circuit boards 16 include printed circuit boards, metal core printed circuit boards, stripboards, and breadboards. In the illustrated embodiment, circuit boards 16 are printed circuit boards. In certain embodiments, a printed circuit board may have a thermal conductive structure. The thermal conductive structure comprises a thermal spreader layer having an embossed pattern formed on its surface, an adhesive glue layer formed over the thermal spreader, and a surface metallic layer attached to the thermal spreader layer and the glue layer. A portion of the surface metallic layer may be in direct contact or almost direct contact with the thermal spreader layer. In certain embodiments, heat dissipation unit 26a may be attached to the thermal conductive structure to increase the efficiency of heat dissipation.

Fan 14 and/or vent 30 create an air flow 12 through projector 10. In certain embodiments, fan 14 and/or vent 30 may direct air flow 12 such that air flow 12 passes by heat dissipation unit 26a with light sources 20 that require stricter junction temperature control before passing by heat dissipation unit 26b with light sources 20 that require less strict junction temperature control to optimize cooling effectiveness. For example, air flow 12 passes over the heat dissipation units associated with the red, green, and blue LEDs, in that order.

In the illustrated embodiment, fan 14 operates as an intake device and directs air flow 12 over the first heat dissipation unit 26a before the second heat dissipation unit 26b. In this embodiment, vent 30 acts as an exhaust vent and is positioned to enable air flow 12 over first heat dissipation unit 26a before second heat dissipation unit 26b. In certain embodiments, fan 14 acts as an exhaust fan that pulls air across first heat dissipation unit 26a before second heat dissipation unit 26b. In such an embodiment, vent 30 acts as an intake vent and is positioned to enable air flow 12 over first heat dissipation unit 26a before second heat dissipation unit 26b.

Air gap 32 between first thermal subsystem 18a and second thermal subsystem 18b may reduce or prevent the heat generated by second thermal subsystem 18b from affecting the junction temperature of first light source 20a, and vice-versa. This may reduce the reliance on heat dissipation units 26 and fan 14 to cool the light sources 20. The inclusion of air gap 32 may allow the volumes of heat dissipation units 26 to be independently selected to achieve the desired junction temperature control for light sources 20.

Figure 2:
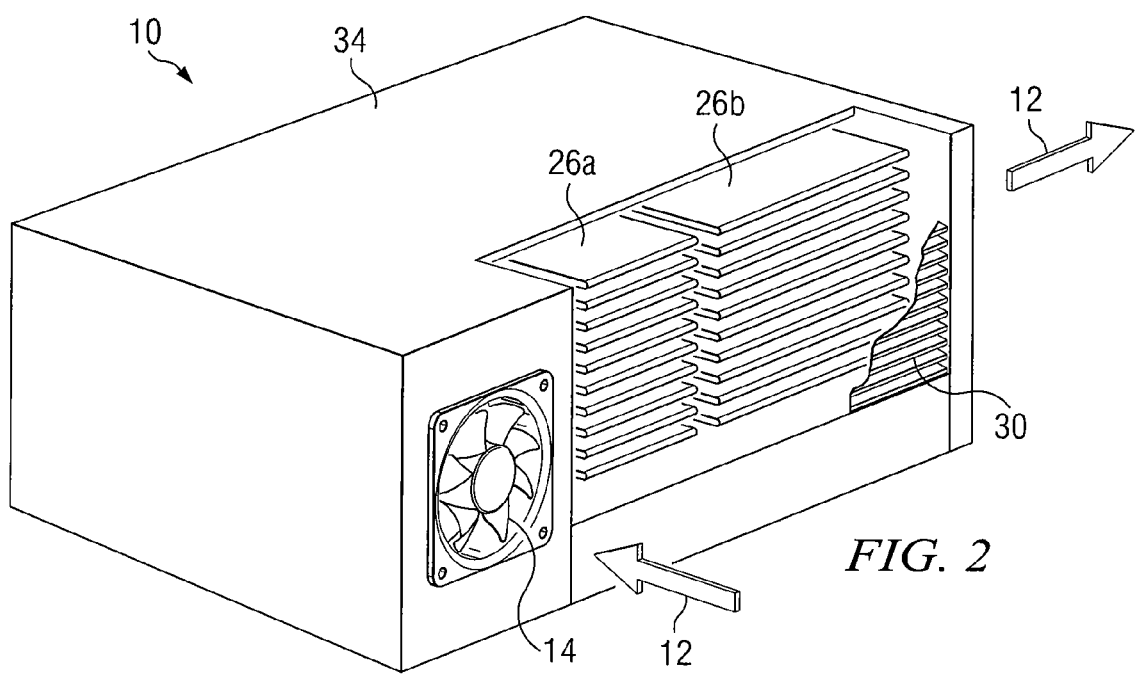
FIG. 2 is a perspectival view of an embodiment of a projector.

FIG. 2 is a perspective view of another embodiment of an image projector 10. In this embodiment, projector 10 is a small form factor projector. In the illustrated embodiment, projector 10 is surrounded by a housing 34 that may comprise metal, plactic, and/or some other suitable material. FIG. 2 includes a cutaway view of housing 34 that reveals first heat sink 26a and second heat sink 26b. Projector 10 includes cooling fan 14 externally placed and functioning as an intake device to provide air flow 12 through housing 34 and out from exhaust vent 30.

Figure 3:
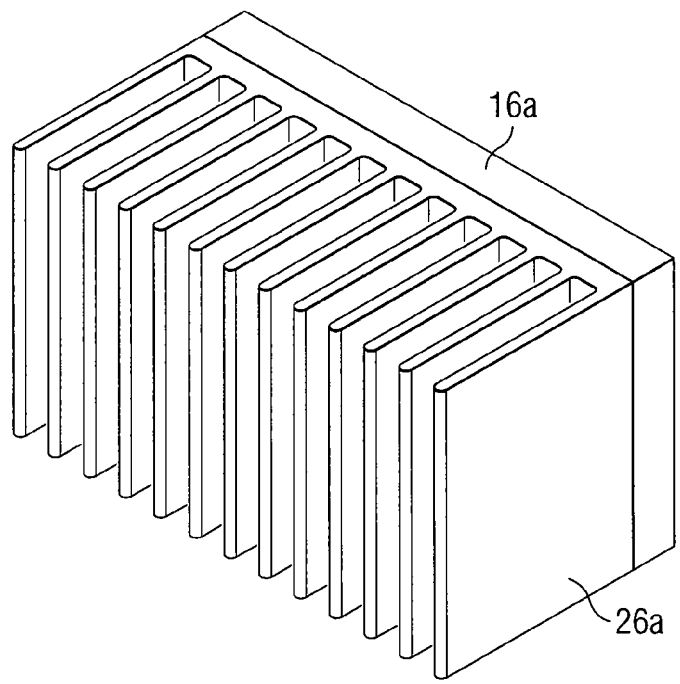
FIG. 3 is a perspectival view of a first heat sink and first circuit board associated with FIGS. 1 and 2.

FIG. 3 is a perspective view of an embodiment of a first heat sink 26a and a first circuit board 16a. In certain embodiments, first heat sink 26a is used to control the junction temperature of a red LED. In the illustrated embodiment, first heat sink 26a is a finned heat sink 26 comprising a metal device with any suitable number of fins. The high thermal conductivity of the metal and its large surface area may produce the rapid transfer of heat to the surrounding cooler air. Finned heat sinks 26 are typically made of copper or aluminum alloy and may have a dozen or more fins. In certain embodiments, the dimensions of the first heat sink 26a may be 10 mm to 22 mm×8 mm to 19 mm×5 mm to 13 mm with 5 mm to 9 mm fins.

Figure 4:
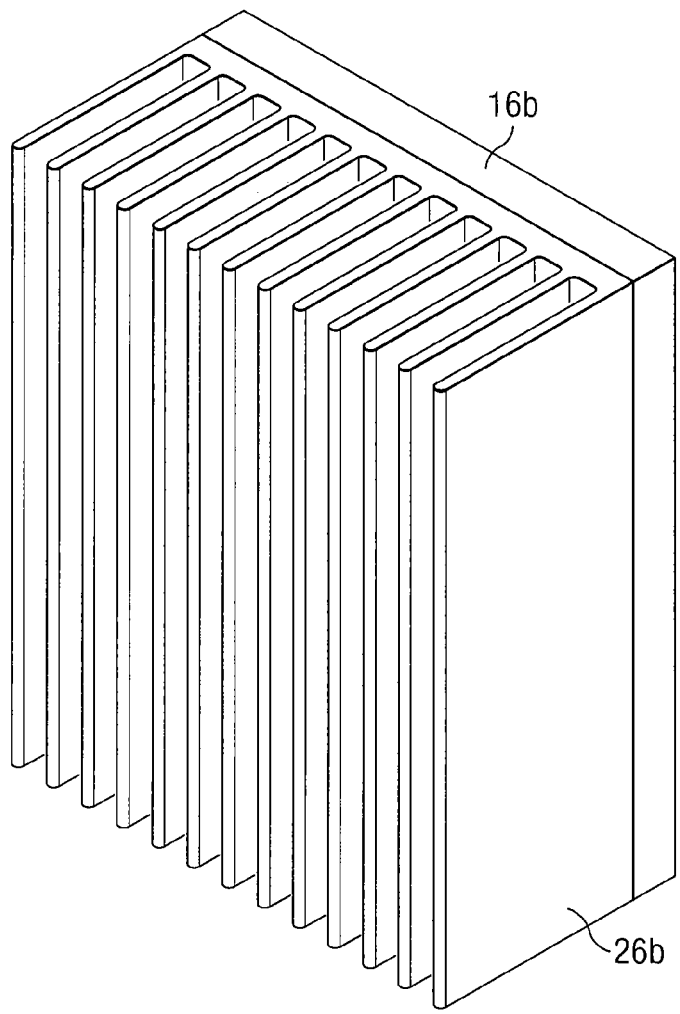
FIG. 4 is a perspectival view of a second heat sink and second circuit board associated with FIGS. 1 and 2.

FIG. 4 is a perspective view of an embodiment of a second heat sink 26b and a second circuit board 18b. In certain embodiments, second heat sink 26b is used to control the junction temperature of a green LED and a blue LED. In certain embodiments, the dimensions of the second heat sink 26b may be 10 mm to 22 mm×20 mm to 34 mm×5 mm to 13 mm with 5 mm to 9 mm fins.

In certain embodiments, the volume of heat sinks 26, 28 may be proportional to the power dissipation of the light sources 20. That is, if the power dissipation of light emitter 20a is X % and that of light emitters 20b and 20c is 100%-X % of the total power dissipation of lights sources 20, then the volume of first heat sink 20 may be approximately X % and that of second heat sink 28 may be approximately 100%-X % of the total volume of heat sinks 26 and 28. Variable X may have any suitable value, for example, a value in the range of 20% to 60%, such as a value in 30% to 50%.

It will be apparent that many modifications and variations may be made to embodiments of the present invention, as set forth above, without departing substantially from the principles of the present invention. Therefore, all such modifications and variations are intended to be included herein within the scope of the present invention, as defined in the claims that follow.

What is claimed is:

1. An apparatus for cooling one or more components of a projector, the apparatus comprising:
    one or more first light emitting diodes (LEDs) configured to generate light of a first color, a first LED having a first desired junction temperature;
    one or more first heat sinks configured to dissipate heat generated by the one or more first LEDs;
    two or more second LEDs configured to generate light of a second and third color, the second LEDs having a second desired junction temperature that is higher than the first desired junction temperature;
    a second heat sink configured to dissipate heat generated by both the two or more second LEDs;
    a cooling fan that directs air flow over the first heat sink and the one or more second heat sinks; and
    an exhaust vent that enables the air flow over the one or more first heat sinks and the one or more second heat sinks.

2. The apparatus of claim 1, the one or more first LEDs comprising a red LED.

3. The apparatus of claim 1, the two or more second LEDs comprising:
    a green LED; and
    a blue LED.

4. The apparatus of claim 1, the air flow flowing across the one or more first heat sinks before flowing across the second heat sink.

5. The apparatus of claim 1, the cooling fan comprising one of a blower fan or an exhaust fan.

6. The apparatus of claim 1, the one or more first heat sinks and the second heat sink separated by an air gap.

7. The apparatus of claim 1, a volume of the one or more first heat sinks comprising 20% to 60% of a total volume of the one or more first heat sinks and the second heat sink.

8. A method for cooling one or more components of a projector, the method comprising:
    generating light for a first color by one or more first light emitters having a first desired junction temperature;
    dissipating, by one or more first heat dissipation units, heat generated by the one or more first light emitters;
    generating light of a second and third color by two or more second light emitters having a second desired junction temperature that is higher than the first desired junction temperature;
    dissipating, by a second heat dissipation unit, heat generated by both the two or more second light emitters;
    directing air flow by a fan over the one or more first heat dissipation units and the second heat dissipation unit; and
    enabling, by a vent, air flow over the one or more first heat dissipation units and the second heat dissipation unit.

9. The method of claim 8, wherein the one or more first light emitters comprises a red LED.

10. The method of claim 8, wherein the two or more second light emitters comprises:
    a green LED; and
    a blue LED.

11. The method of claim 8, the directing the air flow by the fan further comprising directing the air flow across the one or more first heat dissipation units before the second heat dissipation unit.

12. The method of claim 8, wherein the fan comprises one of a blower fan or an exhaust fan.

13. The method of claim 8, wherein the one or more first heat dissipation units and the second heat dissipation unit are separated by an air gap.

14. The method of claim 8, wherein a volume of the one or more first heat dissipation units comprises 20% to 60% of a total volume of the one or more first heat dissipation units and the second heat dissipation unit.

* * * * *